United States Patent
Fagerlund et al.

(10) Patent No.: US 10,012,326 B2
(45) Date of Patent: Jul. 3, 2018

(54) NOISE REDUCING DIFFUSER TRIM WITH CHEVRONS

(71) Applicant: FISHER CONTROLS INTERNATIONAL LLC, Marshalltown, IA (US)

(72) Inventors: Allen C. Fagerlund, Marshalltown, IA (US); Daniel J. Eilers, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 0 days.

(21) Appl. No.: 15/134,796

(22) Filed: Apr. 21, 2016

(65) Prior Publication Data
US 2016/0312917 A1 Oct. 27, 2016

Related U.S. Application Data

(60) Provisional application No. 62/150,733, filed on Apr. 21, 2015.

(51) Int. Cl.
*F16K 47/08* (2006.01)
*F16K 1/54* (2006.01)

(52) U.S. Cl.
CPC .............. *F16K 47/08* (2013.01); *F16K 1/54* (2013.01); *Y10T 137/86799* (2015.04)

(58) Field of Classification Search
CPC ... F16K 47/08; F16K 1/54; F16K 1/12; Y10T 137/86799; Y10T 137/86734
USPC ............. 251/121, 127; 137/625.3, 625.38; 138/42
See application file for complete search history.

(56) References Cited

U.S. PATENT DOCUMENTS

| | | | | |
|---|---|---|---|---|
| 3,524,592 A | * | 8/1970 | Gustafsson | F22G 5/123 137/625.12 |
| 3,722,854 A | * | 3/1973 | Parola | F16K 47/08 251/127 |
| 3,880,399 A | * | 4/1975 | Luthe | F16K 47/02 137/625.37 |

(Continued)

FOREIGN PATENT DOCUMENTS

| EP | 3009723 A1 | 4/2016 |
|---|---|---|
| JP | H0960763 A | 3/1997 |

OTHER PUBLICATIONS

Search Report for International application No. PCT/US2016/028578, dated Jun. 21, 2016.

(Continued)

*Primary Examiner* — John Bastianelli
(74) *Attorney, Agent, or Firm* — Marshall, Gerstein & Borun LLP

(57) ABSTRACT

A fluid valve includes a valve body having a fluid inlet and a fluid outlet connected by a fluid passageway. A valve seat is disposed within the fluid passageway. A fluid control member is movably disposed within the fluid passageway, the fluid control member cooperating with a trim assembly to control fluid flow through the fluid passageway. The trim assembly includes a cage having a plurality of openings that characterize fluid flowing through the cage and a plurality of chevrons surrounding each opening that suppress noise generated by the plurality of openings.

18 Claims, 4 Drawing Sheets

(56) References Cited

U.S. PATENT DOCUMENTS

| | | | | |
|---|---|---|---|---|
| 3,917,221 | A | * | 11/1975 | Kubota .................. F16K 47/08 137/625.37 |
| 3,990,475 | A | * | 11/1976 | Myers ...................... F16K 3/34 137/625.3 |
| 4,149,563 | A | * | 4/1979 | Seger ........................ F16K 3/34 137/625.3 |
| 4,249,574 | A | * | 2/1981 | Schnall ..................... F15C 1/02 137/625.3 |
| 4,442,047 | A | * | 4/1984 | Johnson .................. B01F 5/045 137/897 |
| 5,419,371 | A | * | 5/1995 | Berchem ................. E21B 43/12 138/109 |
| 6,766,826 | B2 | * | 7/2004 | Baumann ................ F16K 47/08 137/625.3 |
| 8,141,586 | B2 | * | 3/2012 | Stepanov ................ F16K 47/10 137/625.33 |
| 2009/0174087 | A1 | | 7/2009 | Bauer |
| 2013/0126770 | A1 | | 5/2013 | O'Brien |

OTHER PUBLICATIONS

Written Opinion for International application No. PCT/US2016/028578, dated Jun. 21, 2016.

* cited by examiner

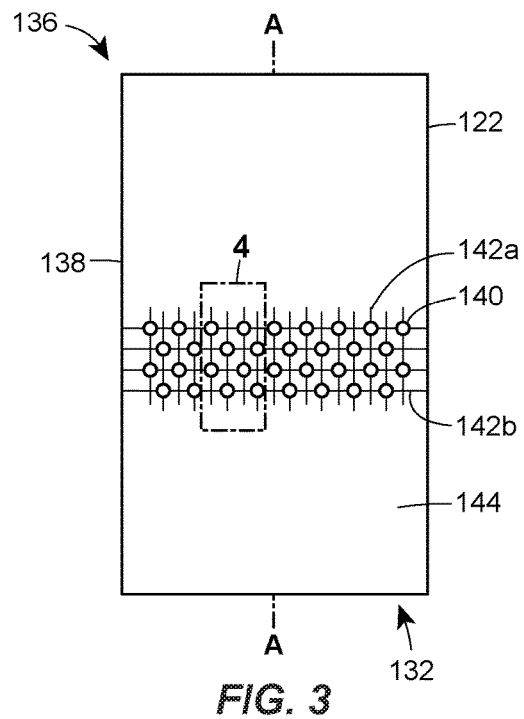
FIG. 3
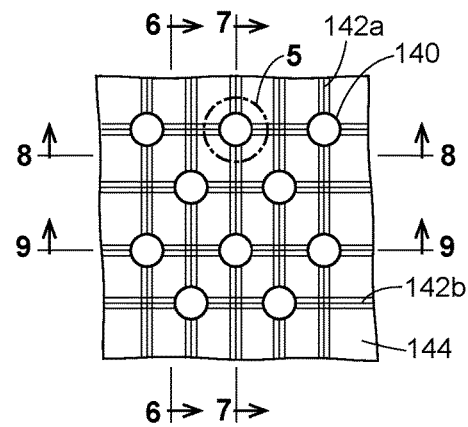
FIG. 4
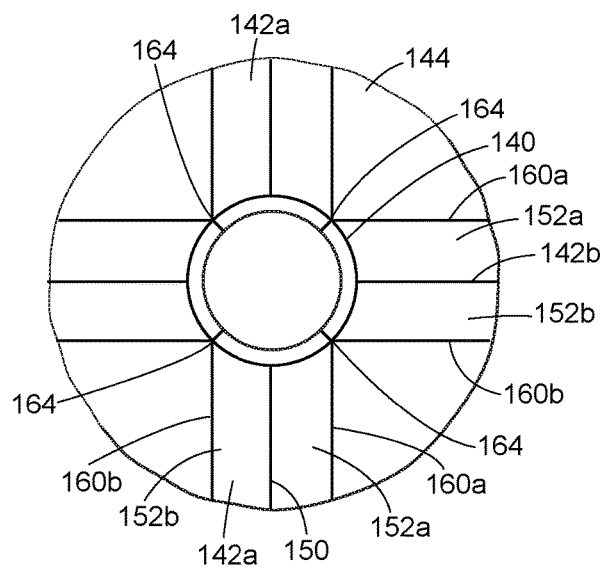
FIG. 5
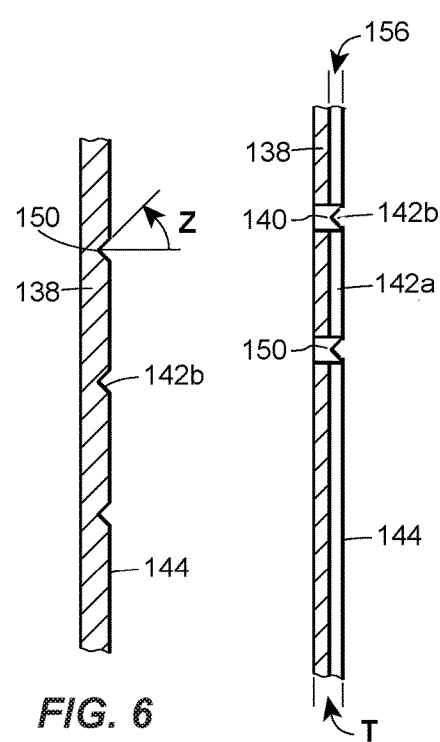
FIG. 6
FIG. 7

NOISE REDUCING DIFFUSER TRIM WITH CHEVRONS

BACKGROUND

Field of the Disclosure

The invention generally relates to control valves including a trim assembly having a cage with a plurality of pressure reducing openings and more specifically to a control valve trim with a cage having a plurality of pressure reducing openings that are surrounded by a plurality of chevrons.

Related Technology

Fluid valves control the flow of fluid from one location to another. When the fluid valve is in a closed position, high pressure fluid on one side is prevented from flowing to a lower pressure location on the other side of the valve. Often fluid valves contain a movable fluid control member and a seat of some sort that cooperates with the fluid control member to control fluid flow through the valve. In some cases it may be desirable to characterize fluid as it flows through the valve, for example, to reduce pressure. In these cases, a trim assembly may be used that includes a cage with a plurality of pressure reducing openings. The openings may be sized and shaped to characterize fluid flow through the trim assembly, for example by reducing fluid pressure. However, the pressure reducing openings create turbulent flow downstream of the valve trim, which results in unwanted noise.

Turning now to FIG. 1, a known control valve 10 is illustrated. The control valve 10 includes a valve body 12 having a fluid inlet 14 and a fluid outlet 16 connected by a fluid passageway 18. A trim assembly 20 is disposed within the valve body 12 between the fluid inlet 14 and the fluid outlet 16. The trim assembly 20 includes a cage 22 and a seat 24. A fluid control member, such as a plug 26 is disposed within the cage 22 and the plug 26 interacts with the seat 24 to control fluid flow through the valve body 12. A stem 28 is connected to the plug 26 at one end and an actuator 30 at another end. The actuator 30 controls movement of the plug 26 within the cage 22.

As illustrated in FIG. 2, the cage 22 includes a first end 32 and a second end 36. A cage wall 38 extends between the first end 32 and the second end 36, the cage wall 38 forming a hollow central bore within which the valve plug 26 slides to control fluid flow through the cage 22. A plurality of cage openings 40 is formed in the cage wall 38. The plurality of cage openings 40 characterize fluid flowing through the cage 22, by for example, reducing the pressure of the fluid as it flows through the openings 40. The openings may be generally circular in shape with a central axis B that is perpendicular to a longitudinal axis A of the cage 22.

SUMMARY OF THE DISCLOSURE

In one aspect, a fluid valve comprises a valve body having a fluid inlet and a fluid outlet connected by a fluid passageway; a trim assembly disposed within the fluid passageway, the trim assembly having a cage and a seat; a fluid control member movably disposed within the fluid passageway, the fluid control member cooperating with the trim assembly to control fluid flow through the fluid passageway; a plurality of openings disposed in a wall of the cage, the plurality of openings characterizing fluid flow through the trim assembly; and a plurality of chevrons disposed around each opening in the plurality of openings, the plurality of chevrons smoothing flow exiting the opening with surrounding fluid flow to suppress noise generated by the fluid flowing out of the plurality of openings.

In another aspect, a trim assembly for a control valve comprises a cage; a seat; and a fluid control member movably disposed within the fluid passageway, the fluid control member cooperating with the trim assembly to control fluid flow through the fluid passageway; wherein a plurality of openings is disposed in a wall of the cage, the plurality of openings characterizing fluid flow through the trim assembly; and a plurality of chevrons is disposed around each opening in the plurality of openings, the plurality of chevrons smoothing flow exiting the opening with surrounding fluid flow to suppress noise generated by the fluid flowing out of the plurality of openings In yet another aspect, a cage for a trim assembly of a control valve comprises a cage wall extending from a first end to a second end, the cage wall forming a hollow circular cylinder; a plurality of openings disposed in the cage wall, the plurality of openings characterizing fluid flow through the cage; and a plurality of chevrons surrounding each opening in the plurality of openings, the plurality of chevrons smoothing fluid exiting the opening with surrounding fluid flow to suppress noise generated by the fluid flowing out of the plurality of openings.

In further accordance with any one or more of the foregoing aspects, a control valve, trim assembly, or a cage as outlined above may further include any one or more of the following preferred forms.

In some preferred forms, the plurality of chevrons is formed by a plurality of channels disposed in an outer surface of the cage. In other preferred forms, the plurality of channels includes at least four channels that radiate outward from each opening in the plurality of openings, the plurality of channels optionally including at least one channel that is oriented parallel to a longitudinal axis of the cage and at least one channel that is oriented perpendicular to the longitudinal axis of the cage or at least one channel that is oriented at approximately 45 degrees relative to the longitudinal axis of the cage.

In other preferred forms, at least one channel in the plurality of channels includes two channel walls that meet at a bottom, the channel walls optionally being angled relative to the outer surface of the cage wall in the range of between 20 degrees and 80 degrees, preferably between 30 degrees and 70 degrees, and more preferably between 40 degrees and 50 degrees.

In other preferred embodiments, the bottom optionally extends inward from the outer surface of the cage wall to a depth of between 70 percent and 30 percent of a thickness of the cage wall, or between 60 percent and 40 percent of the thickness of the cage wall, or about 50 percent of the thickness of the cage wall.

BRIEF DESCRIPTION OF THE DRAWINGS

FIG. 3 is a side view of one embodiment of a cage of a noise reducing trim assembly constructed in accordance with the teachings of the disclosure;

FIG. 4 is a close-up view of section of the cage of FIG. 3 identified in box 4 of FIG. 3;

FIG. 5 is a close-up view of one of the openings of the cage of FIG. 3 identified in circle 5 of FIG. 4;

FIG. 6 is a longitudinal cross-sectional view of the cage of FIG. 3 taken along line 6-6 in FIG. 4;

FIG. 7 is a longitudinal cross-sectional view of the cage of FIG. 3 taken along line 7-7 in FIG. 4;

DETAILED DESCRIPTION

The trim assemblies and cages described herein advantageously provide reduced noise signatures when compared to prior art trim assemblies. The disclosed trim assemblies and cages may be used as stand-alone trim assemblies or cages, or the disclosed trim assemblies or cages may be combined with other trim assemblies to produce trim assemblies that characterize fluid flow while reducing noise. While the disclosed trim assemblies and cages may be used in any type of valve, the disclosed trim assemblies and cages may be particularly useful in sliding stem control valves, rotary valves, globe valves, and as in-line diffusers.

Figure 1:
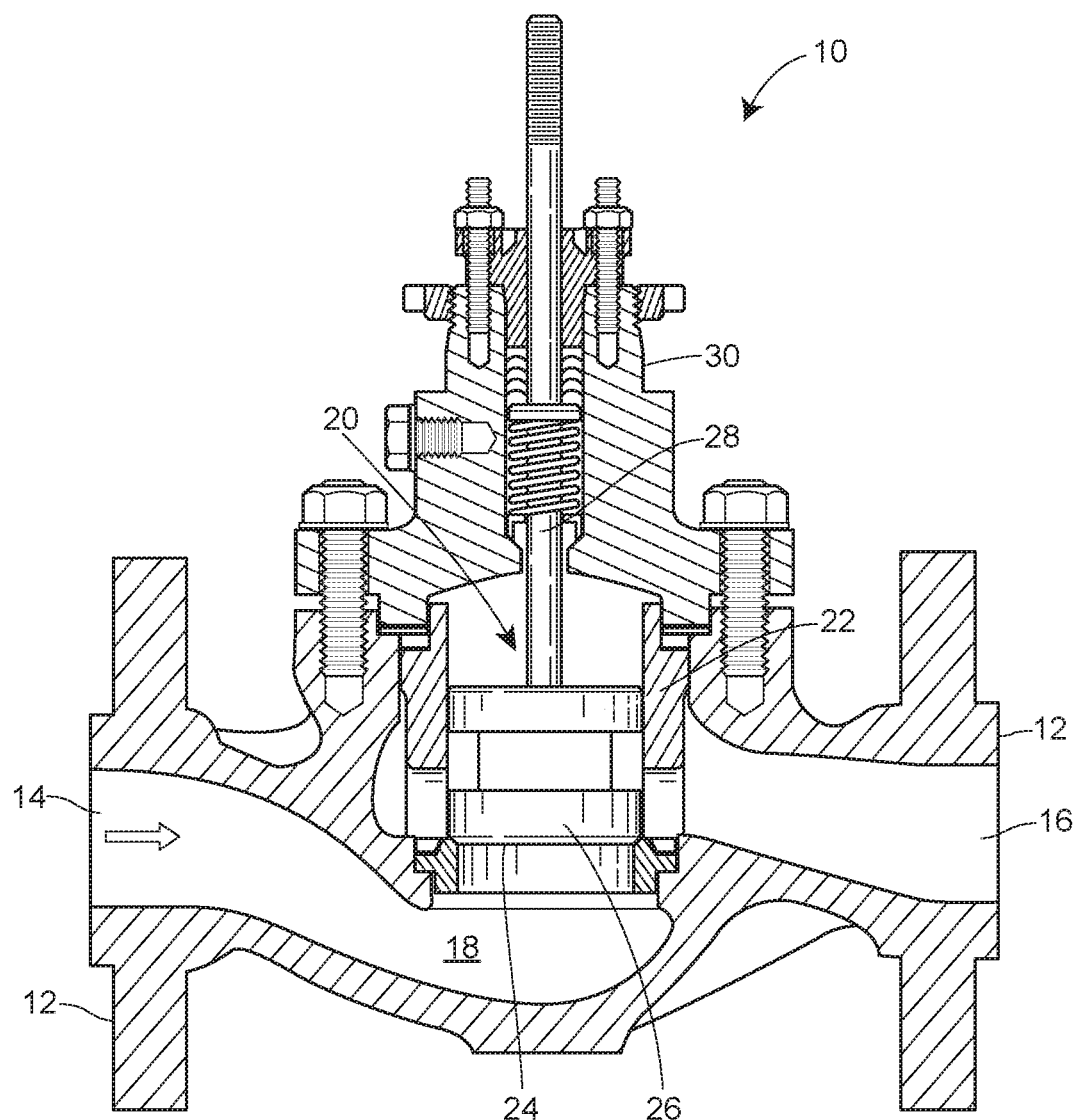
FIG. 1 is a cross-sectional view of a known control valve having a known trim assembly.
Figure 2:
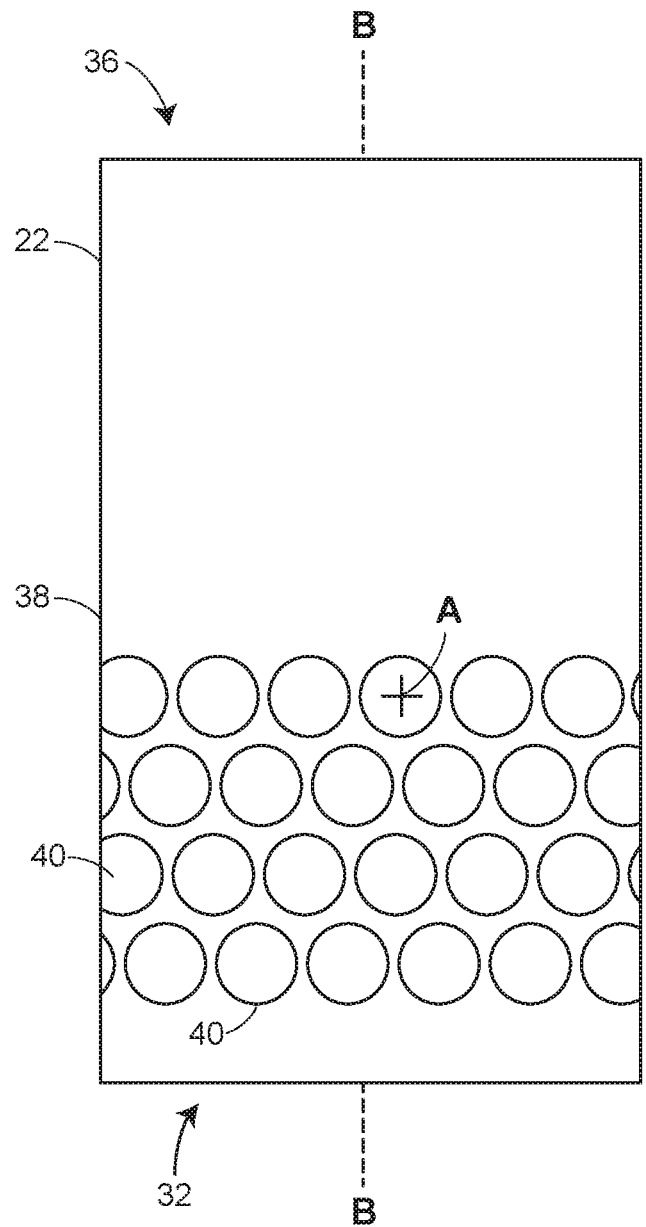
FIG. 2 is a close up view of a cage of the trim assembly of FIG. 1.
Figure 8:
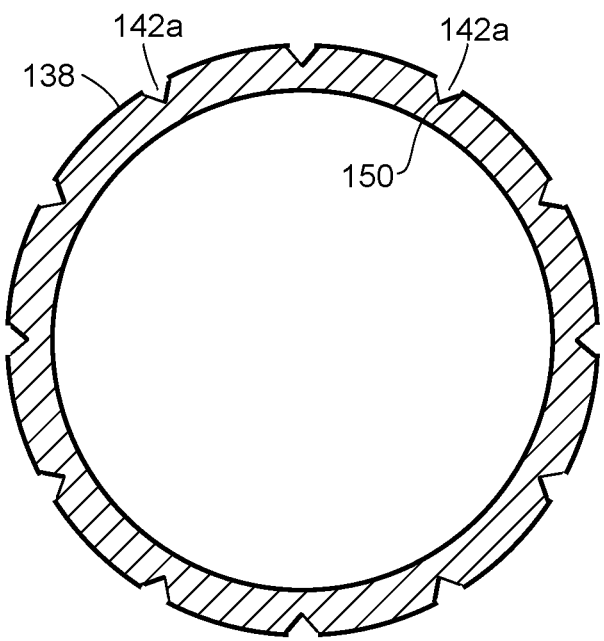
FIG. 8 is a lateral cross-sectional view of the cage of FIG. 3 taken along line 8-8 in FIG. 4.
Figure 9:
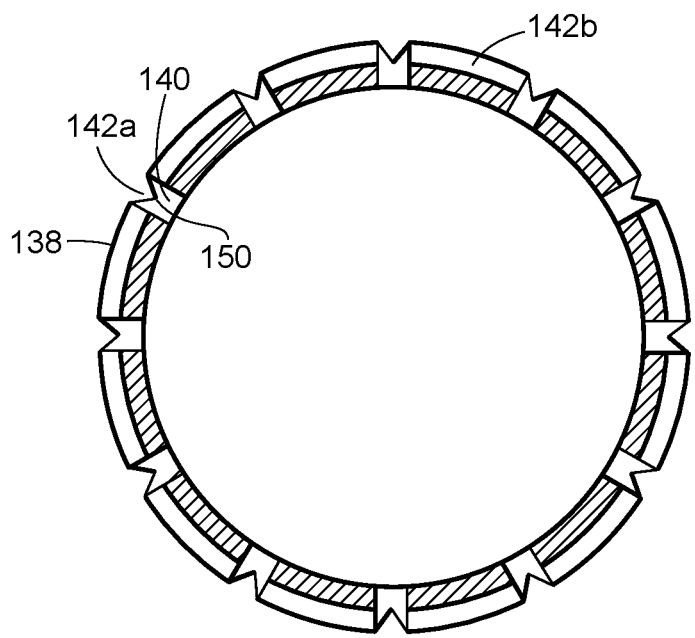
FIG. 9 is a lateral cross-sectional view of the cage of FIG. 3 taken along line 9-9 in FIG. 4.

Turning now to FIGS. 3-9, one embodiment of a cage 122 that is constructed in accordance with the teachings of the disclosure may include a first end 132 and a second end 136. The cage 122 may be used in a conventional control valve, such as the control valve 10 of FIG. 1. A cage wall 138 extends between the first end 132 and the second end 136, the cage wall 138 forming a hollow central bore within which the valve plug slides to control fluid flow through the cage 122. A plurality of cage openings 140 is formed in the cage wall 138. The plurality of cage openings 140 characterize fluid flowing through the cage 122, for example, by reducing the pressure of the fluid as it flows through the plurality of openings 140. A plurality of channels 142a, 142b may be formed in an outer surface 144 of the cage wall 138. In one embodiment, each opening in the first plurality of openings 140 may be surrounded by four equally spaced channels 140a, 140b that radiate outward from the opening. In other embodiments, each opening in the plurality of openings 140 may be surrounded by more or less than four equally spaced channels 142. For example, each opening in the plurality of openings 140 may be surrounded by two, three, four, five, six, seven, nine, ten, eleven, twelve or more channels 142. In the embodiment of FIGS. 3-5, the channels 142a, 142b are arranged orthogonally relative to one another. For example, the channels 142a may be arranged parallel to the longitudinal axis A of the cage 122, while the channels 142b may be arranged perpendicular to the longitudinal axis A of the cage 122. In other embodiments, the channels 142a, 142b may be arranged at other angles relative to the longitudinal axis A.

Each channel 142a, 142b may be a V-shaped channel cut or otherwise milled or formed in the outer surface 144 of the cage 122. The V-shaped channel may include a trough or bottom 150, which forms the deepest portion of the channel relative to the outer surface 144. A first channel wall 152a may extend outward from the bottom 150 at an angle relative to the outer surface 144. The include angle, Z, as illustrated in FIG. 6, may be in the range of between approximately 20 degrees and approximately 60 degrees, preferably between approximately 30 degrees and approximately 50 degrees, and more preferably between approximately 35 degrees and approximately 45 degrees. Further, a second channel wall 152b may extend outward from the bottom 150 at an angle relative to the outer surface 144 that is the same as the angle Z of the first channel wall 152a.

The bottom 150 of the channel 142a, 142b may extend inward into the cage wall 138, away from the outer surface 144, to a depth 156 of between approximately 40% and approximately 20% of the cage wall thickness T, and more preferably approximately 30% of the cage wall thickness T, as illustrated in FIG. 7.

Returning now to FIG. 5, the first channel wall 152a of the first channel 142a meets the outer surface 144 of the cage wall 138 at a first outer edge 160a and the second channel wall 152b meets the outer surface 144 of the cage wall 138 at a second outer edge 160b. Similarly, the first channel wall 152a of the second channel 142b meets the outer surface 144 of the cage wall 138 at a first outer edge 160a and the second channel wall 152b of the second channel 142b meets the outer surface 144 of the cage wall 138 at a second outer edge 160b. The first edge 160a of the first channel 142a meets the second edge 160b of the second channel 160b at the opening 140, which forms a point or chevron 164. The other outer edges of the other channel walls meet to form other chevrons 164. The chevrons 164 change the exit geometry of the openings 140 such that a reduction in noise is realized. It is believed that the chevrons 164 interrupt the exit flow at the opening 140 and fluid surrounding the cage 122, which results in reduced efficiency of the noise source In one embodiment, a cage wall having opening-to-chevron width ratio in the range of 1:½ to 1:1 ratio yielded noise reductions of approximately 4 to 6 decibels. Other chevron configurations, opening sizes, and pressures generally reduce noise between 2 and 8 decibels depending on pressure and opening configurations.

Although certain cages, trim assemblies, and control valves have been described herein in accordance with the teachings of the present disclosure, the scope of the appended claims is not limited thereto. On the contrary, the claims cover all embodiments of the teachings of this disclosure that fairly fall within the scope of permissible equivalents.

The invention claimed is:

1. A cage for a trim assembly of a control valve, the cage comprising:
   a cage wall extending from a first end to a second end, the cage wall forming a hollow circular cylinder;
   a plurality of openings disposed in the cage wall, the plurality of openings characterizing fluid flow through the cage; and
   a plurality of chevrons disposed around each opening in the plurality of openings, the plurality of chevrons smoothing fluid flow exiting the openings with surrounding fluid flow to suppress noise generated by the fluid flowing out of the plurality of openings,
   wherein each chevron in the plurality of chevrons is formed by a plurality of channels formed in an outer surface of the cage, a first edge of a first channel meeting a second edge of a second channel at a first opening in the plurality of openings to form each chevron, and
   wherein the first channel extends between the first opening and a second opening, and the second channel extends between the first opening and a third opening.

2. The cage of claim 1, wherein the chevrons produce a noise reduction in the range of approximately 2 and 8 decibels.

3. The fluid valve of claim 1, wherein at least one channel in the plurality of channels includes two channel walls that meet at a bottom.

4. The fluid valve of claim 1, wherein the channel walls are angled relative to the outer surface of the cage wall, the channel walls area being angled in the range of between 20 degrees and 60 degrees.

5. The fluid valve of claim 3, wherein the bottom extends inward from the outer surface of the cage wall to a depth of between 40 percent and 20 percent of a thickness of the cage wall.

6. A trim assembly for a fluid control valve, the trim assembly comprising:
a cage;
a seat; and
a fluid control member movably disposed within the fluid passageway, the fluid control member cooperating with the cage and the seat to control fluid flow through the fluid passageway;
wherein a plurality of openings is disposed in a wall of the cage, the plurality of openings characterizing fluid flow through the trim assembly, and a plurality of chevrons is formed around each opening in the plurality of openings, the plurality of chevrons smoothing fluid flow exiting the opening with surrounding fluid flow to suppress noise generated by the fluid flowing out of the plurality of openings, and wherein each chevron in the plurality of chevrons is formed by a plurality of channels formed in an outer surface of the cage, a first edge of a first channel meeting a second edge of a second channel at a first opening in the plurality of openings to form each chevron, and
wherein the first channel extends between the first opening and a second opening, and the second channel extends between the first opening and a third opening.

7. The fluid valve of claim 6, wherein the plurality of channels includes at least four channels that radiate outward from each opening in the plurality of openings.

8. The fluid valve of claim 7, wherein the plurality of channels includes at least one channel that is oriented parallel to a longitudinal axis of the cage and at least one channel that is oriented perpendicular to the longitudinal axis of the cage.

9. The fluid valve of claim 7, wherein the plurality of channels includes at least one channel that is oriented at approximately 45 degrees relative to the longitudinal axis of the cage.

10. The fluid valve of claim 6, wherein at least one channel in the plurality of channels includes two channel walls that meet at a bottom.

11. A fluid valve comprising:
a valve body having a fluid inlet and a fluid outlet connected by a fluid passageway;
a trim assembly disposed within the fluid passageway, the trim assembly having a cage and a seat;
a fluid control member movably disposed within the fluid passageway, the fluid control member cooperating with the trim assembly to control fluid flow through the fluid passageway;
a plurality of openings disposed in a wall of the cage, the plurality of openings characterizing fluid flow through the trim assembly, and
a plurality of chevrons formed around each opening in the plurality of openings, the plurality of chevrons interrupting fluid flow exiting the opening with surrounding fluid flow to suppress noise generated by the fluid flowing out of the plurality of openings,
wherein each chevron in the plurality of chevrons is formed by a plurality of channels formed in an outer surface of the cage, a first edge of a first channel meeting a second edge of a second channel at a first opening in the plurality of openings to form each chevron, and
wherein the first channel extends between the first opening and a second opening, and the second channel extends between the first opening and a third opening.

12. The fluid valve of claim 11, wherein the plurality of channels includes at least four channels that radiate outward from each opening in the plurality of openings.

13. The fluid valve of claim 12, wherein the plurality of channels includes at least one channel that is oriented parallel to a longitudinal axis of the cage and at least one channel that is oriented perpendicular to the longitudinal axis of the cage.

14. The fluid valve of claim 12, wherein the plurality of channels includes at least one channel that is oriented at approximately 45 degrees relative to the longitudinal axis of the cage.

15. The fluid valve of claim 1, wherein at least one channel in the plurality of channels includes two channel walls that meet at a bottom.

16. The fluid valve of claim 15, wherein the channel walls are angled relative to the outer surface of the cage wall.

17. The fluid valve of claim 16, wherein the include angle of the channel is in the range of between 20 degrees and 60 degrees.

18. The fluid valve of claim 15, wherein the bottom extends inward from the outer surface of the cage wall to a depth of between 40 percent and 20 percent of a thickness of the cage wall.

* * * * *